F. NICHOLS, Dec'd.
E. A. NICHOLS, Admr'x.
Carboy.

No. 217,896. Patented July 29, 1879.

WITNESSES:
W. W. Hollingsworth
Edw. W. Byrn

INVENTOR:
F. Nichols
BY
ATTORNEYS.

UNITED STATES PATENT OFFICE.

FRANCIS NICHOLS, (ELLEN A. NICHOLS, ADMINISTRATRIX OF FRANCIS NICHOLS, DECEASED,) OF NEW LONDON, CONNECTICUT, ASSIGNOR TO ACID PUMP AND SIPHON COMPANY, OF SAME PLACE.

IMPROVEMENT IN CARBOYS.

Specification forming part of Letters Patent No. 217,896, dated July 29, 1879; application filed December 5, 1878.

*To all whom it may concern:*

Be it known that I, FRANCIS NICHOLS, of the city and county of New London, and State of Connecticut, have invented a new and Improved Carboy; and I do hereby declare that the following is a full, clear, and exact description of the same, reference being had to the accompanying drawings, forming part of this specification, in which—

Figure 1:
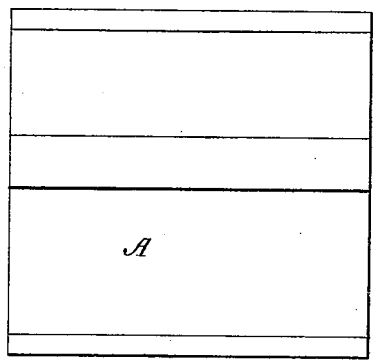
Figure 2:
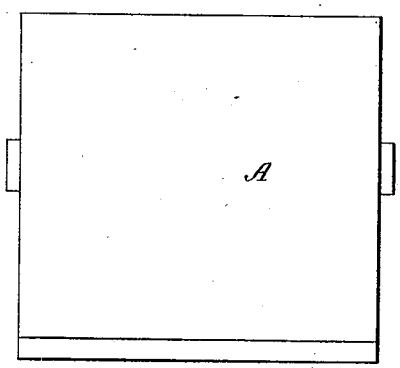
Figure 3:
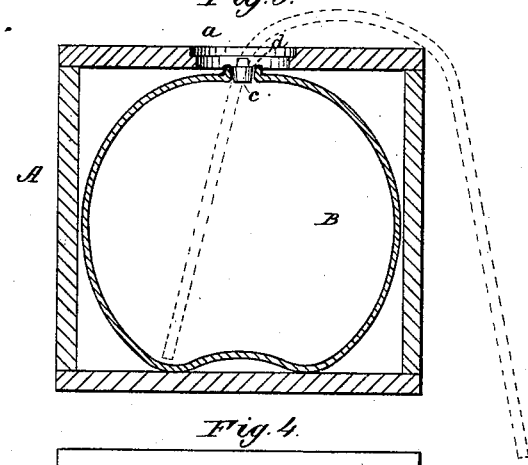
Figure 4:
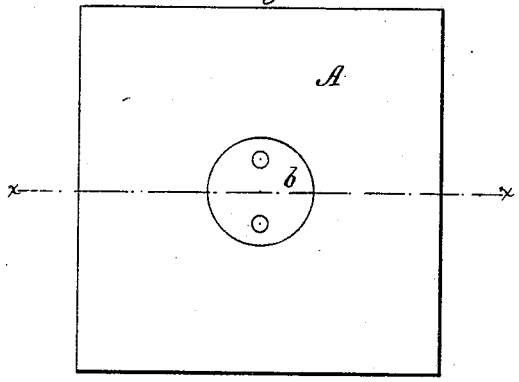
Figure 5:
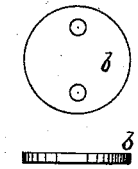

Figures 1 and 2 are side views of the carboy. Fig. 3 is a vertical section; Fig. 4, a plan view; Fig. 5, detail views of the metal covering-plate.

My invention relates to an improved carboy. The object of the same is to secure the greatest possible holding capacity with the occupancy of least space; and to this end it consists, as a new article of manufacture, of a globular glass vessel having a flanged opening, mouth, or stopper-seat located in the perimeter of its curved form, without the prolongation of a neck between said mouth and the body of the vessel, which glass vessel is completely and permanently inclosed in a plain six-sided wooden case, made tangential to the said glass vessel at the center of its sides, and having in the center of one of said sides an opening registering with the opening of the glass vessel, as hereinafter more fully described.

In the drawings, A represents a cubical wooden case having six plain sides, one of which is perforated with a hole, *a*, and is provided with a metal closing-plate, *b*. This plate fits down into a rabbet or recess around the hole *a*, so as to be flush with the outer surface, and is detachably held in place by screws.

B is the globular glass vessel, provided in the arc of its curved form with a flanged mouth and stopper-seat, *c*, to receive a stopper, *a*, between which stopper and the body of the vessel there is no prolongation of neck. This opening *c* registers with the hole in the case, so as to permit the tube of a siphon or pump to be inserted. The globular glass vessel approaches closely all six sides of the cubical case, so as to fill the same, with the exception of the corners, which are filled with any suitable packing.

The merit of my invention is found in the fact that my carboy has the greatest possible holding capacity at the expense of the least space, the plain sides of the case permitting the compact storage of one carboy upon another, while the adaptation of the glass vessel to the case obviates the waste space which would be one of the objectionable concomitants of the old form of glass vessel when packed in a cubical case.

The location of the holes in the case and the glass vessel at the point where the said glass vessel is practically tangential to the case not only obviates the necessity of a prolonged neck by taking advantage of the bulge or projection of the curvature, but brings also the orifice in the center, where it is equally accessible from all sides of the carboy.

In rendering my invention more distinctive I fully disclaim all carboys or incased vessels in which there is an extension or prolongation of the neck of the opening between the seat of the stopper and the body of the vessel.

Having thus described my invention, what I claim as new is—

As a new article of manufacture, a carboy consisting of a globular glass vessel having a mouth or stopper-seat in the perimeter of its globular form, without the prolongation of a neck between the same and the body of vessel, the said glass vessel being inclosed by a plain-sided cubical case having an opening in the center of one of its sides, registering with the opening in the glass vessel, substantially as described.

FRANCIS NICHOLS.

Witnesses:
    JOHN BATES,
    WILLIAM S. STARR.